(12) United States Patent
Harris

(10) Patent No.: US 10,660,276 B1
(45) Date of Patent: May 26, 2020

(54) COVER FOR PLANTS AND METHOD OF USE

(71) Applicant: Chester Harris, Blythewood, SC (US)

(72) Inventor: Chester Harris, Blythewood, SC (US)

( * ) Notice: Subject to any disclaimer, the term of this patent is extended or adjusted under 35 U.S.C. 154(b) by 0 days.

(21) Appl. No.: 16/522,831

(22) Filed: Jul. 26, 2019

(51) Int. Cl.
*A01G 13/02* (2006.01)
*A01G 13/04* (2006.01)
*A01G 13/10* (2006.01)

(52) U.S. Cl.
CPC ....... *A01G 13/105* (2013.01); *A01G 13/0206* (2013.01); *A01G 13/04* (2013.01); *A01G 13/043* (2013.01)

(58) Field of Classification Search
CPC ... A01G 13/0206; A01G 13/04; A01G 13/043
USPC .................................. 47/17, 20.1, 29.6, 29.7
See application file for complete search history.

(56) References Cited

U.S. PATENT DOCUMENTS

| | | | | |
|---|---|---|---|---|
| 2,910,994 A * | 11/1959 | Joy | .......................... | E04H 15/22 52/2.11 |
| 3,453,786 A * | 7/1969 | Raymond | ............ | A01G 9/1407 135/137 |
| 3,812,616 A * | 5/1974 | Koziol | ............... | A01G 13/0231 52/63 |
| 5,479,744 A * | 1/1996 | Meyer | ...................... | A01G 9/16 52/63 |
| 5,660,002 A * | 8/1997 | Lashinger | ................ | A01G 9/16 52/63 |
| 6,098,335 A * | 8/2000 | Brown, Jr. | ............... | A01G 9/16 47/17 |
| 6,618,988 B2 * | 9/2003 | Williams | .................. | A01G 9/16 47/17 |
| 6,625,924 B2 * | 9/2003 | Lundgren | .......... | A01G 13/0231 135/903 |
| 6,701,948 B2 * | 3/2004 | Jopp | ..................... | E04H 15/001 135/115 |
| 6,877,521 B2 * | 4/2005 | Webster | .................. | E04H 15/26 135/99 |
| 7,665,478 B2 * | 2/2010 | Wehner | ..................... | A01G 9/16 135/126 |
| 2013/0340330 A1 * | 12/2013 | DeSalle, Jr. | ........ | A01G 13/0206 47/29.6 |

* cited by examiner

*Primary Examiner* — David J Parsley
(74) *Attorney, Agent, or Firm* — Ted Masters

(57) ABSTRACT

A cover for plants includes, a frame which has a rectangular top tier of rods, a rectangular bottom tier of rods, four vertical supports which connect the top tier of rods to the bottom tier of rods, and four sides. The cover further includes a side cover which is shaped and dimensioned to cover the four sides of the frame, the side cover has four sides, a top, four top corners, and a bottom. The side cover includes four corner closures disposed at the four top corners. The side cover includes a side closure, and a skirt disposed at the bottom. A top cover is shaped and dimensioned to cover the top of the side cover and the top tier of rods. A crown frame is shaped and dimensioned to fit around the top cover.

9 Claims, 9 Drawing Sheets

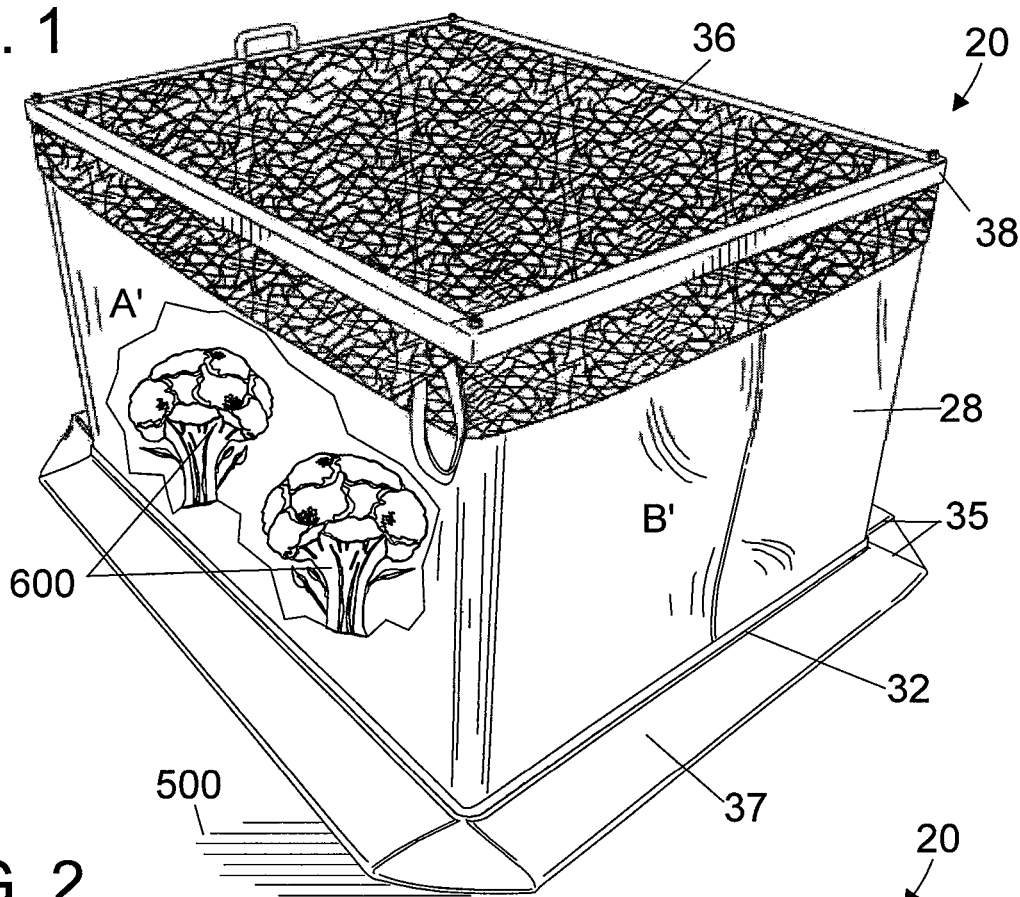
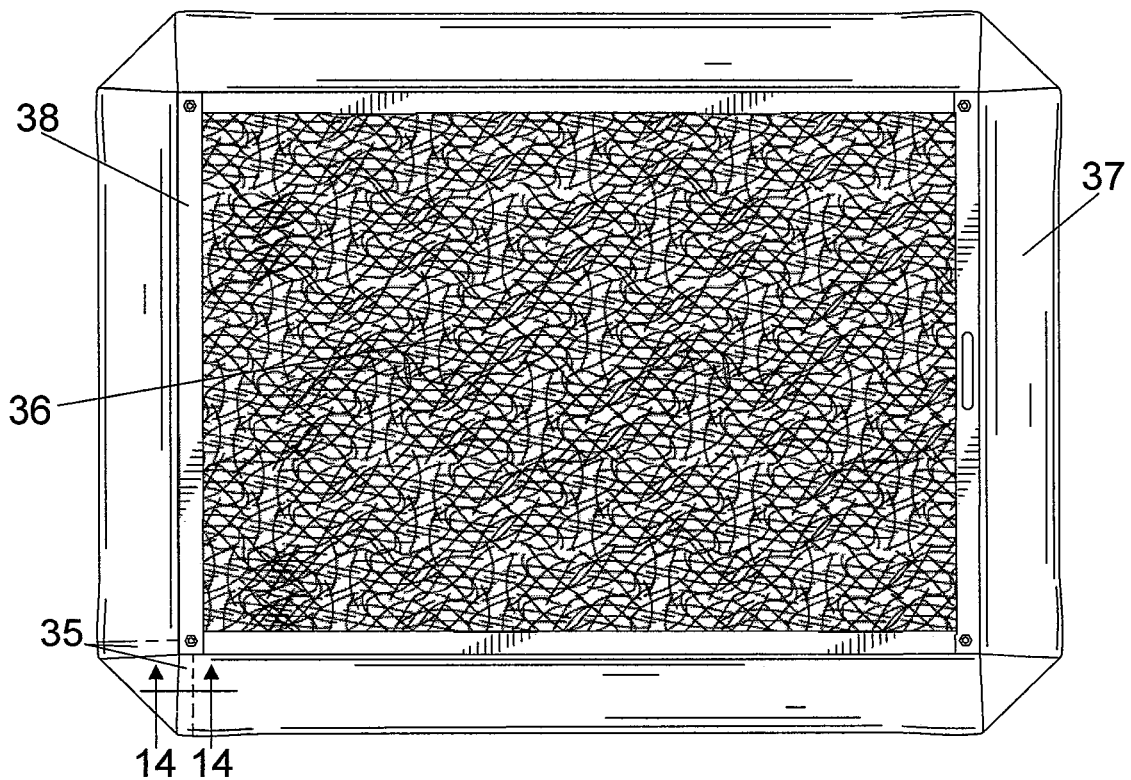

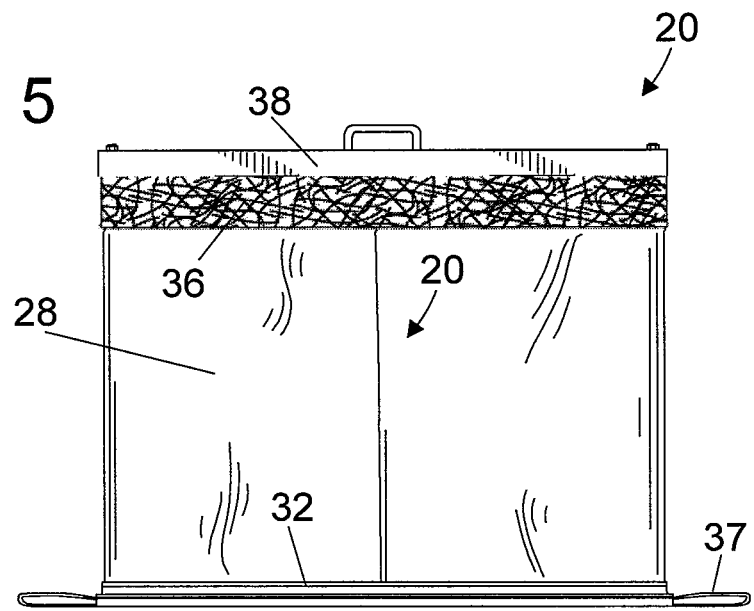
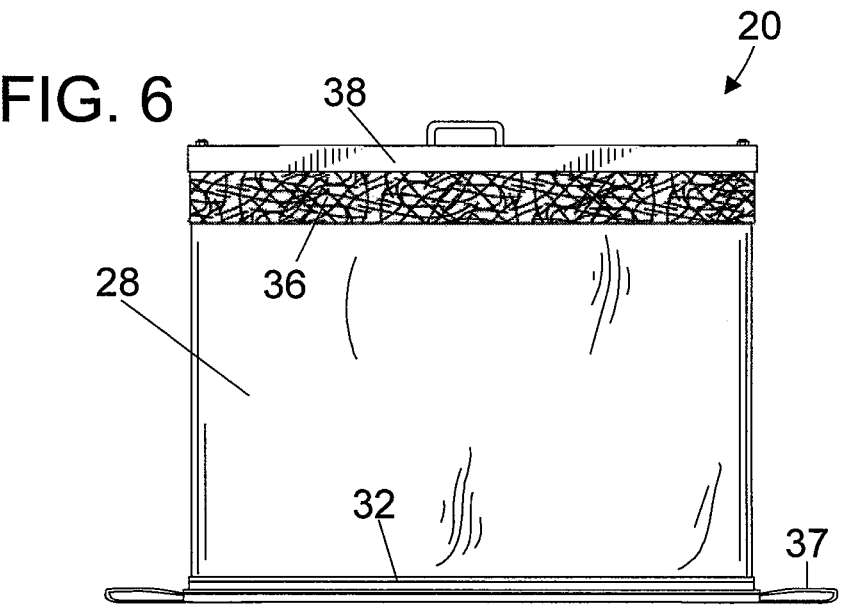

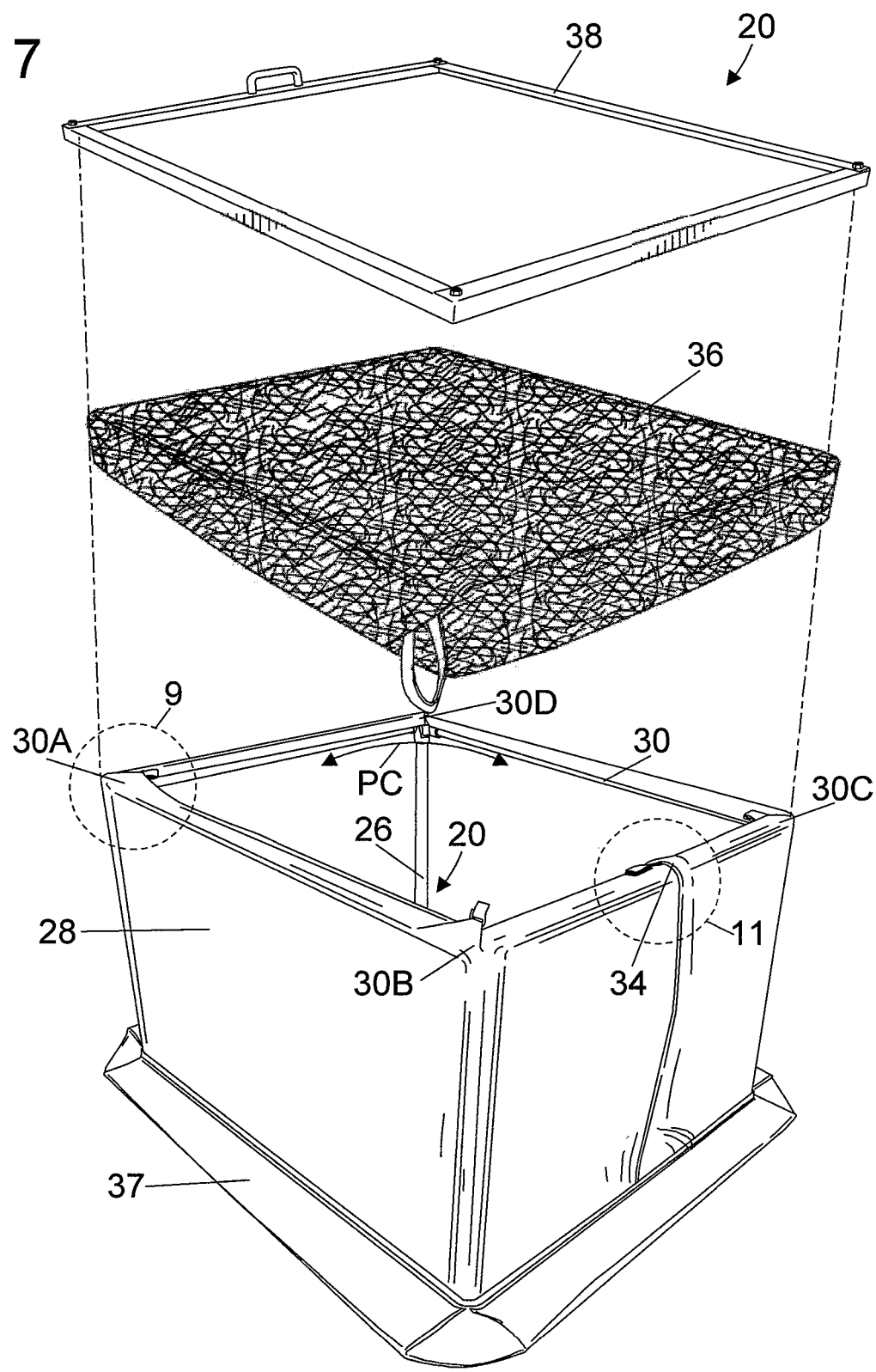

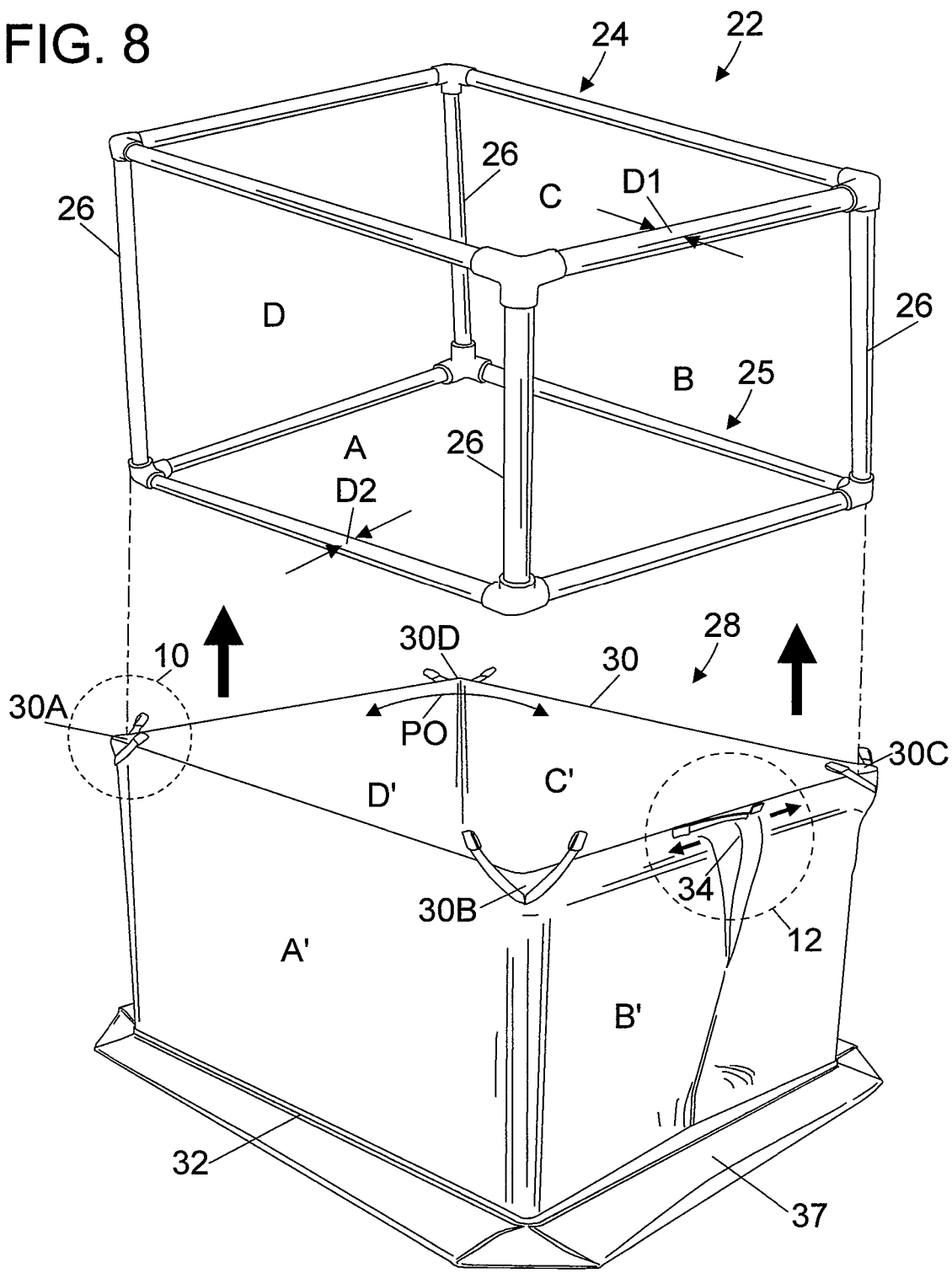

COVER FOR PLANTS AND METHOD OF USE

CROSS REFERENCE TO RELATED APPLICATION

None

TECHNICAL FIELD

The present invention pertains generally to agriculture, and more particularly to a cover which is placed over plants and protects the plant from insects.

BACKGROUND OF THE INVENTION

Insects are a constant threat to plants which grow outdoors, such as in backyard gardens. In the case of vegetable plants the insects can damage the plant's leaves, damage the plant's vegetable, and even kill the plant. Any protective cover must ensure that insects cannot reach the plants.

BRIEF SUMMARY OF THE INVENTION

The present invention is directed to a cover for plants which protects the plants from insects by denying the insects (as well as birds and animals) access to the plants. The cover is specifically designed to minimize openings through which an insect might pass. The cover utilizes permeable fabric which is structurally arranged to permit the passage of light, air, and water, but which will not allow an insect to pass from outside to the protected plants.

In accordance with an embodiment, a cover for plants includes a frame which has a rectangular top tier of rods, a rectangular bottom tier of rods, four vertical supports which connect said top tier of rods to the bottom tier of rods, and four sides. A side cover is shaped and dimensioned to cover the four sides of the frame, the side cover having four sides, a top, four top corners, and a bottom. The side cover includes four corner closures disposed at the four top corners. The side cover includes a side closure. The side cover includes a skirt disposed at the bottom. A top cover is shaped and dimensioned to cover the top of the side cover and the top tier of rods. A crown frame which is shaped and dimensioned to fit around the top cover.

In accordance with another embodiment, the top tier of rods has a first diameter, and the bottom tier of rods has a second diameter, the first diameter being greater than the second diameter.

In accordance with another embodiment, the top of the side cover is positionable to have (1) a closed perimeter, and (2) an open perimeter, the open perimeter being greater than the closed perimeter. Each corner closure includes two strips of cooperating hook-and-loop material. The four corner closures are positionable to (1) a closed position wherein the top of the side cover has the closed perimeter, and (2) an open position wherein the top of the side cover has the open perimeter.

In accordance with another embodiment, the skirt includes four corner inverted pleats.

In accordance with another embodiment, the top cover includes an access panel.

In accordance with another embodiment, the top cover is fabricated from recycled plastic bottles.

Other embodiments, in addition to the embodiments enumerated above, will become apparent from the following detailed description, taken in conjunction with the accompanying drawings, which illustrate, by way of example, the principles of the cover for plants and method of use.

BRIEF DESCRIPTION OF THE DRAWINGS

FIG. 1 is a cutaway perspective view of a cover for plants;
FIG. 2 is a top plan view of the cover;
FIG. 5 an end elevation view of the cover;
FIG. 6 is an opposite end elevation view of the cover;
FIG. 7 is an exploded perspective view of the cover;
FIG. 8 is an exploded perspective view of a side cover being put around a frame.

DETAILED DESCRIPTION OF THE INVENTION

Figure 3:
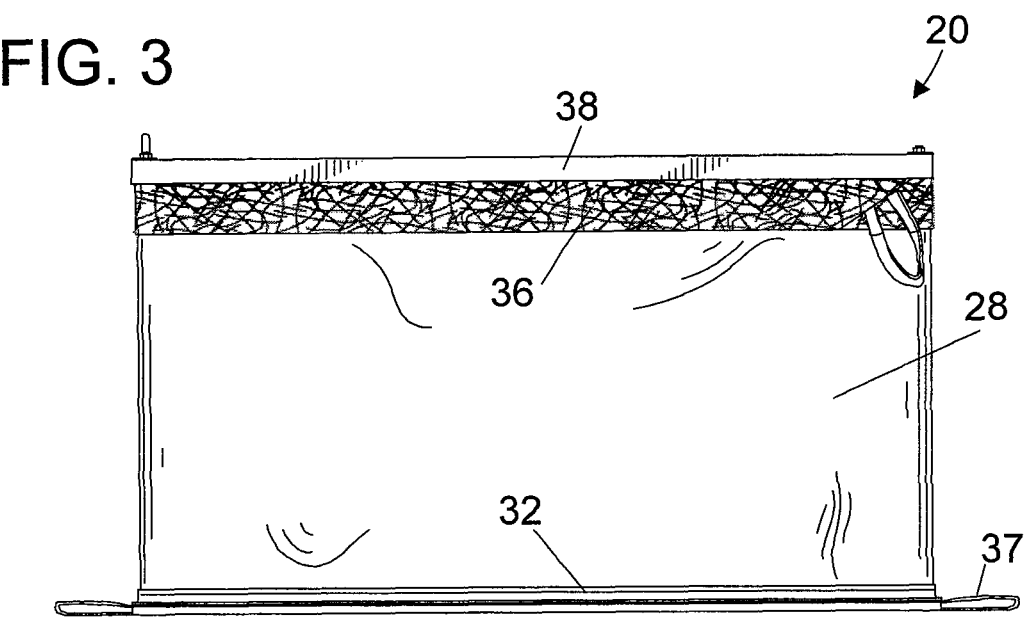
FIG. 3 is a front elevation view of the cover.
Figure 4:
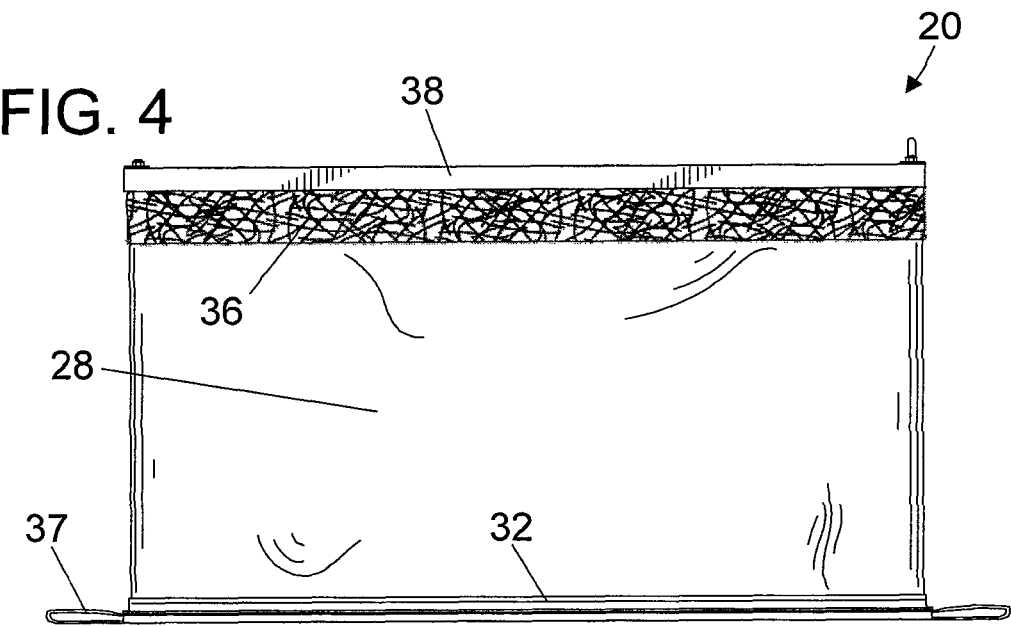
FIG. 4 is a rear elevation view of the cover.

Referring initially to FIGS. 1-7, there are illustrated cutaway perspective, top plan, front elevation, rear elevation, end elevation, opposite end elevation, and exploded perspective views respectively of a cover for plants 500 in accordance with the present invention, the cover being generally designated as 20. Referring also to FIG. 8, cover 20 includes a frame 22 which has a rectangular top tier of rods 24, a rectangular bottom tier of rods 25, four vertical supports 26 which connect said top tier of rods to said bottom tier of rods, and four sides A, B, C, and D. In an embodiment, frame 22 is made from circular PVC pipe and three axes corner connectors, however bamboo, wood, or metal could also be utilized. In an embodiment frame 22 is approximately 30" long, 24" wide, and 19" high, however the dimensions can be adjusted depending upon the plants 500 to be covered.

Referring also to FIG. 8, a side cover 28 is shaped and dimensioned to cover four sides A, B, C, and D of frame 22. Side cover 28 has four sides A', B', C', and D', a top 30, four top corners, and a bottom 32. Four corner closures 30A, 30B, 30C, and 30D are disposed at the top four corners (also refer to FIGS. 11 and 12). Side cover 28 further includes a side closure 34 (also refer to FIGS. 9 and 10). Side cover 28 also includes a skirt 37 disposed at bottom 32. Skirt 37 has four corner inverted pleats 35 (also refer to FIG. 14 and the associated discussion). Side cover 28 is fabricated from a permeable material which will pass air, water, and light, but which has small enough openings so that it will not allow the passage of insects. In one embodiment side cover 28 is a fabric fabricated from a corn-based landscape fabric, however other materials such as netting and fabric meshes could also be utilized.

A top cover 36 is shaped and dimensioned to cover the top 30 of side cover 28 and the top tier of rods 24. Top cover 36 is fabricated from a material which will allow the passage of light. In an embodiment top cover 36 is fabricated from a permeable material which will pass air and some water, but has small enough openings so that it will not allow the passage of insects. In one embodiment top cover 36 is a fabric fabricated from recycled plastic bottles, however other materials such as netting or fabric meshes could also be utilized. It is noted that top cover 36 has four side walls which downwardly project to cover the top part of side cover 28.

A crown frame 38 is shaped and dimensioned to fit around top cover 36. Crown frame 38 serves to hold top cover 36 in place on frame 22. Cover 20 rests upon a support surface 500 such a soil and covers and protects the plants 600.

FIG. 8 is an exploded perspective view of side cover 28 being put around frame 22. It is first noted that each rod of the top tier of rods 24 has a first diameter D1, and that each rod of the bottom tier of rods 25 has a second diameter D2, wherein first diameter D1 is greater than second diameter D2. In one embodiment the rods of top tier 24 have a diameter of 0.75 inches, and the rods of bottom tier 25 have a diameter of 0.5 inches. In practice a convenient way of putting side cover 28 around frame 22 is to invert frame 22 and place it upon a support surface. Then side cover 28 is inverted and place around frame 22. After side cover 28 is in place, the connected combination is then again inverted. It is noted in FIGS. 7 and 8 that top tier of rods 24 has four corners. The four corner closures (30A, 30B, 30C, and 30D) are positionable so that one corner closure is disposed adjacent to each of the four corners of rectangular top tier of rods 24.

Figure 9:
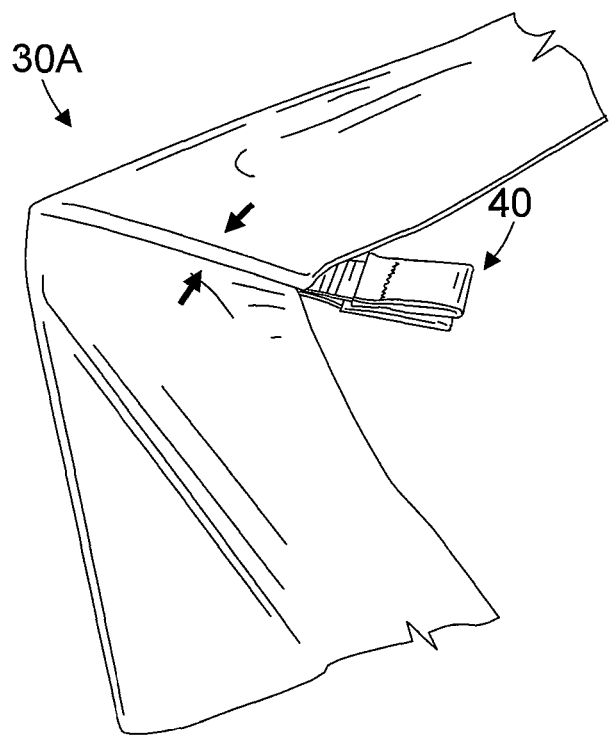
FIG. 9 is an enlarged view of area 9 of FIG. 7.
Figure 10:
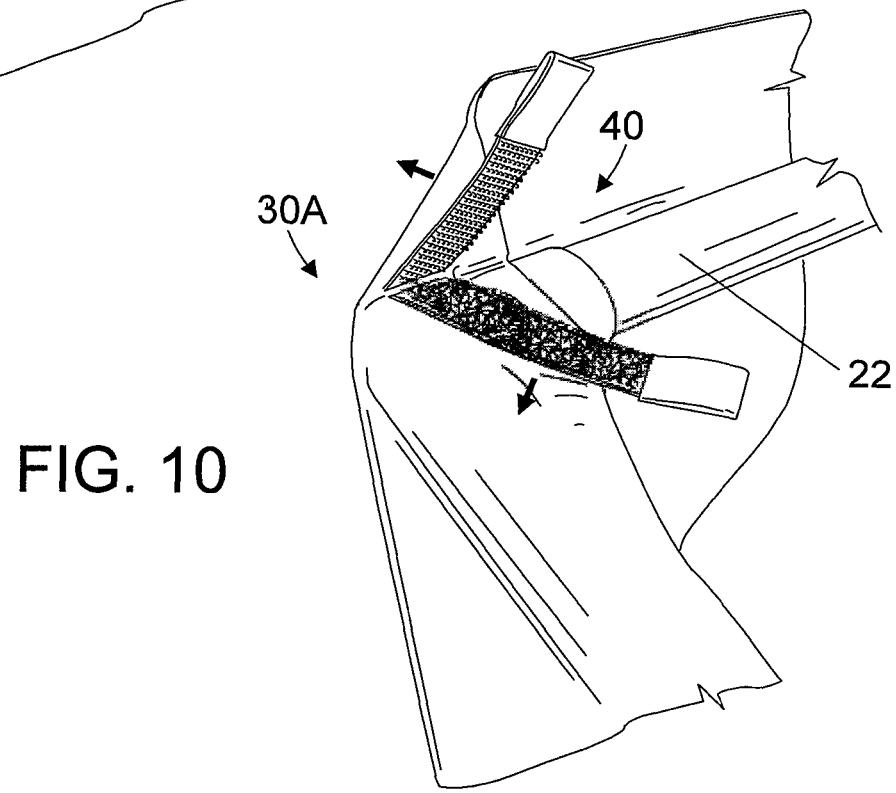
FIG. 10 is an enlarged view of area 10 of FIG. 8.

FIG. 9 is an enlarged view of area 9 of FIG. 7, and FIG. 10 is an enlarged view of area 10 of FIG. 8. Referring briefly to FIGS. 7 and 8, top 30 of side cover 28 has a closed perimeter PC (FIG. 7) and an open perimeter PO (FIG. 8). Closed perimeter PC is greater than open perimeter PO. Referring to FIGS. 9 and 10, each corner closure (30A, 30B, 30C, 30D) includes two strips of cooperating hook-and-loop material 40 which place the corner closures in (1) a closed position wherein top 30 has the closed perimeter PC, or (2) an open position wherein top 30 has open perimeter PO. That is, when engaged strips 40 place the four corner closures in the closed position of FIGS. 9 and 7, wherein the four corner closures overlap frame 22 and hold the top 30 of side cover 28 in place on frame 22 (refer to FIG. 7). Conversely, when disengaged strips 40 place the four corner closures in the open position of FIGS. 10 and 8, wherein the top 30 of side cover 28 is opened so as facilitate putting side cover 28 around frame 22 (refer to FIG. 8).

In FIGS. 1-8 it is noted that in both the closed position and the open position of the four corner closures (30A-30D), side cover 28 is a continuous unbroken sleeve. That is, side cover 28 forms a continuous sleeve which surrounds frame 22.

Figure 11:
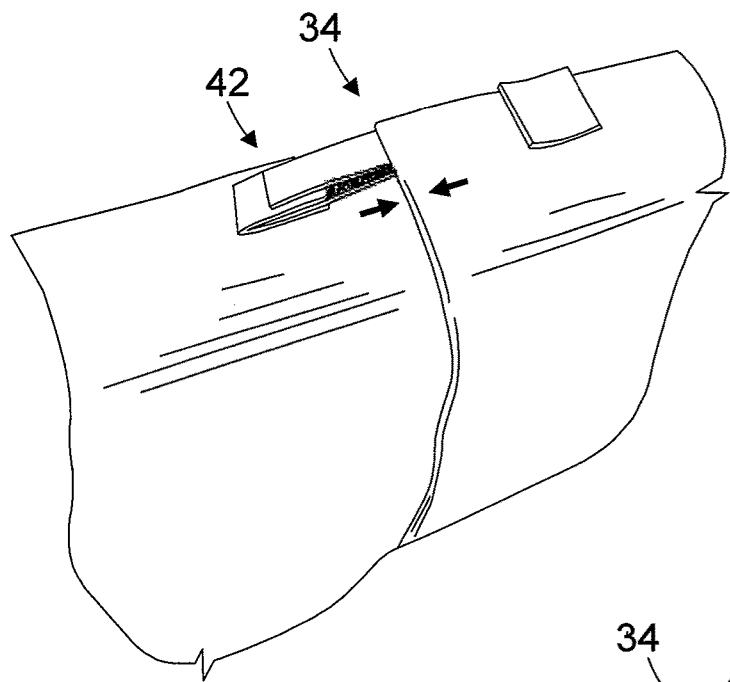
FIG. 11 is an enlarged view of area 11 of FIG. 7.
Figure 12:
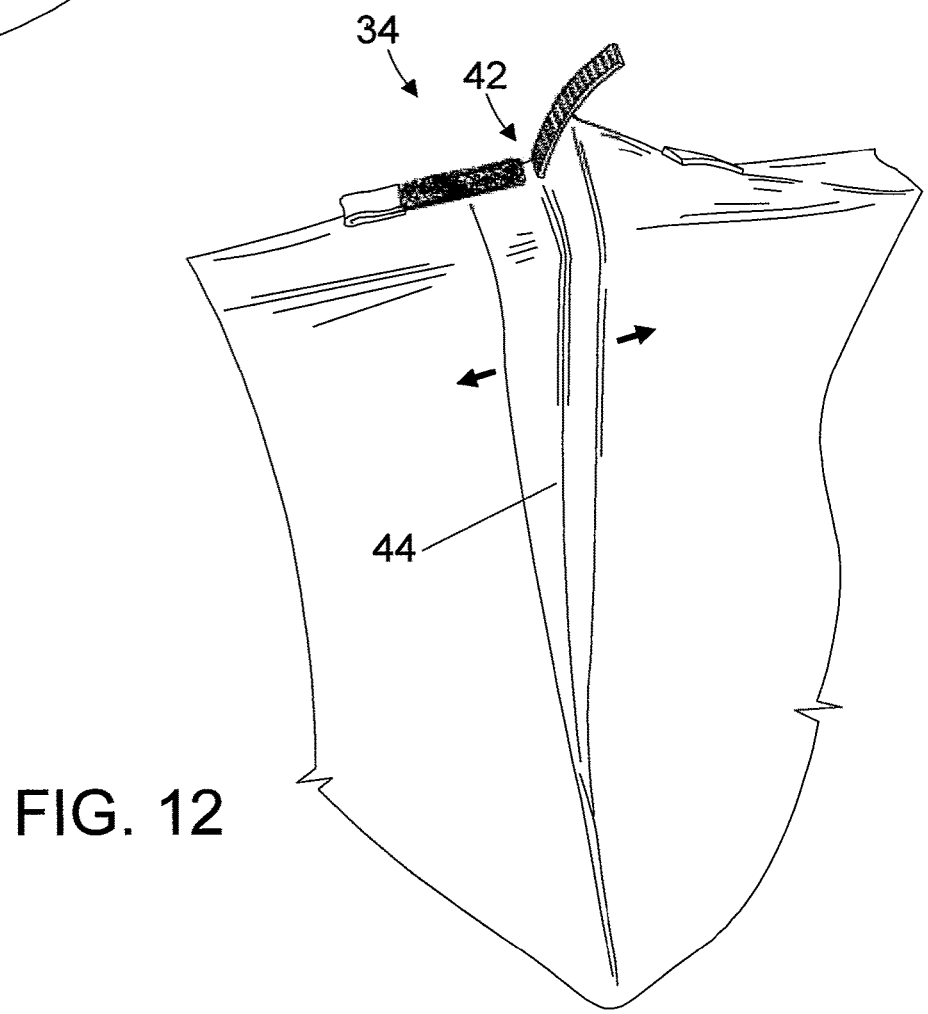
FIG. 12 is an enlarged view of area 12 of FIG. 8.

FIG. 11 is an enlarged view of area 11 of FIG. 7, and FIG. 12 is an enlarged view of area 12 of FIG. 8. Referring also to FIGS. 7 and 8, these figures illustrate side closure 34 in the closed position (FIG. 7), and the open position (FIG. 8). Similar to corner closures 30A, 30B, 30C, and 30D, side closure 34 is utilized to expand or contract the perimeter of the top 30 of side cover 28. In the shown embodiment, side closure 34 includes a pleat 44 (fold). Two strips of cooperating hook-and-loop material 42 are used to close (FIG. 11) or open (FIG. 12) pleat 44. It is noted that it is also possible to place side closures 34 on other sides of side cover 28 (such as on two, three, or all four sides).

Figure 13:
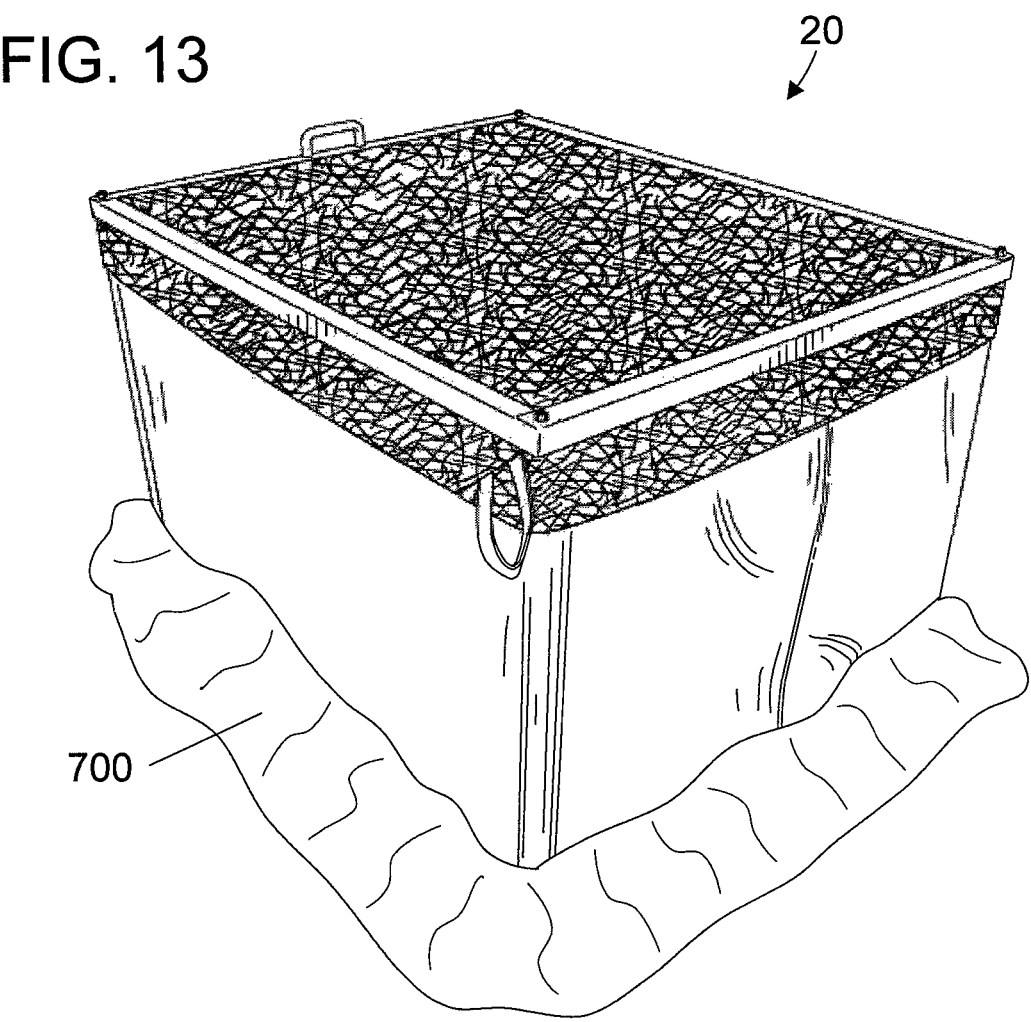
FIG. 13 is a perspective view of the cover with dirt piled upon a skirt.

FIG. 13 is a perspective view of the cover with dirt 700 piled on top of skirt 37 (refer to FIG. 1). Dirt 700 serves to both weigh down cover 20 to prevent if from blowing over due to wind, and also to provide an insect barrier.

Figure 14:
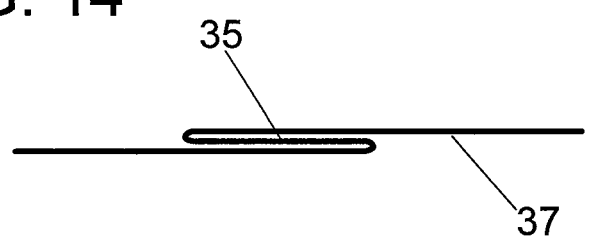
FIG. 14 is a cross sectional view along the line 14-14 of FIG. 2.

FIG. 14 is a cross sectional view along the line 14-14 of FIG. 2 showing one fold of the inverted pleats 35. Referring also to FIG. 2, corner inverted pleats 35 permit skirt 34 to go around the corners of side cover 28.

Figure 15:
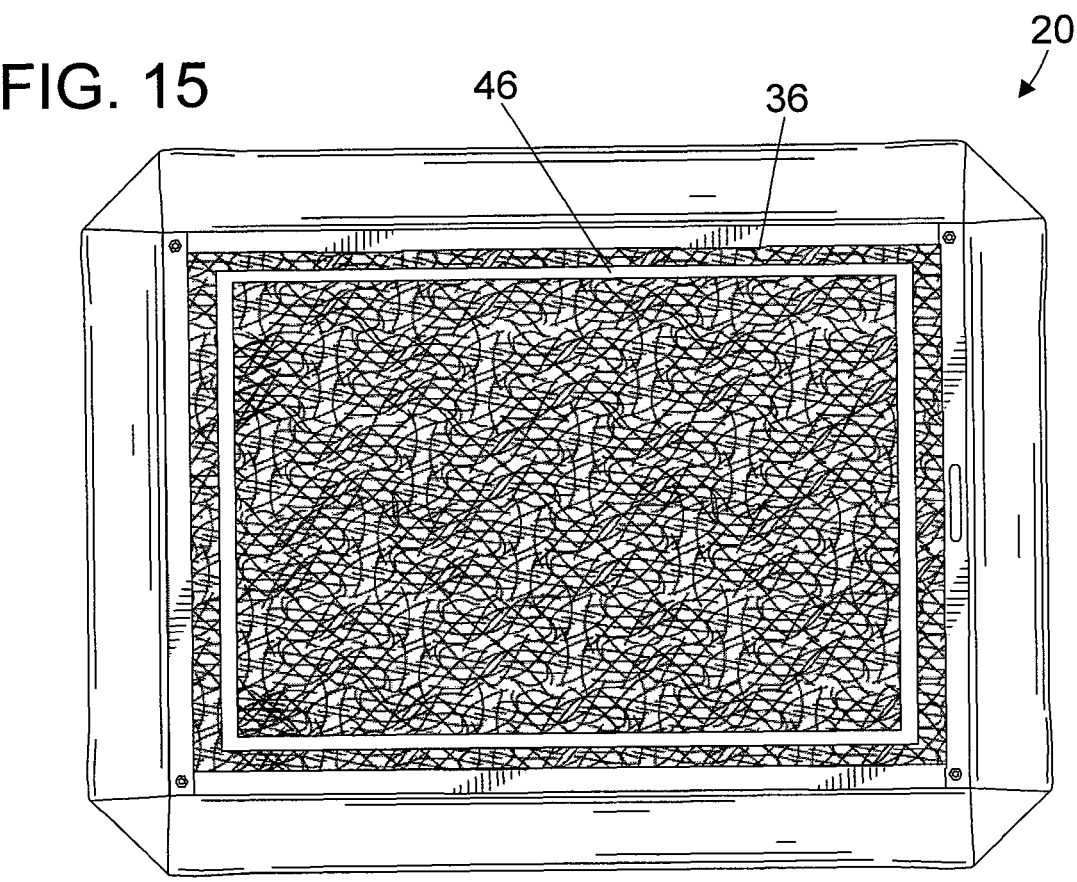
FIG. 15 is a top plan view of an access panel in the top cover with the panel in place; and,
FIG. 16 is a side elevation view of the access panel removed.
Figure 16:
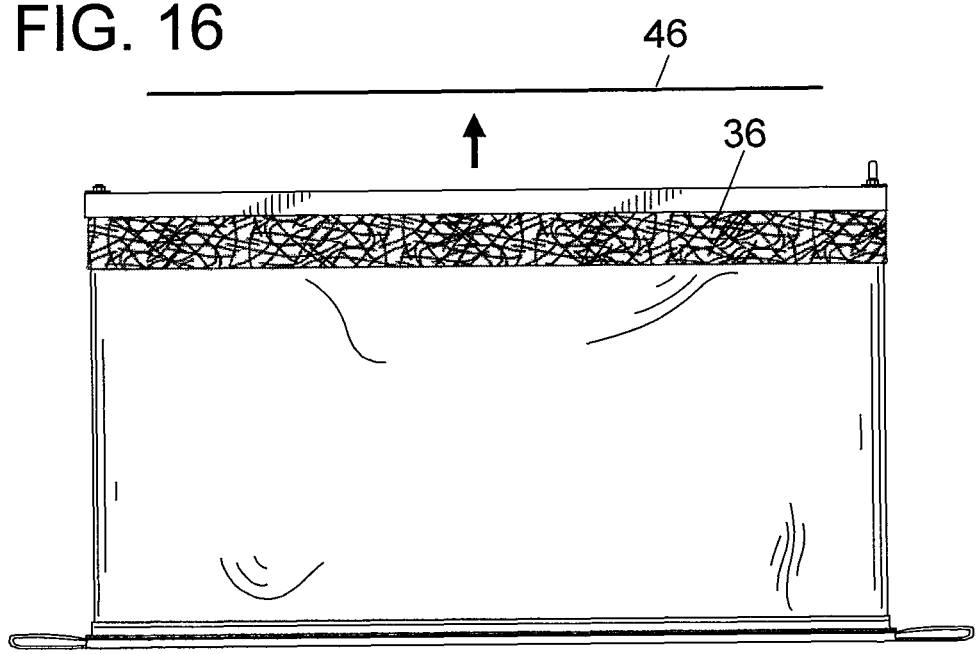

FIG. 15 is a top plan view of an access panel 46 in top cover 36 with the panel 46 in place; and FIG. 16 is a side elevation view of the access panel 46 removed. Access panel 46 is a portion of top cover 36 which has been cut out and can be selectively removed. Access panel 46 can be connected to the body of top cover 36 by means such as by hook-and-loop fasteners, or other means which will provide an insect barrier. Access panel 46 permits user access to the plants 600 (refer to FIG. 1) for watering, caretaking, and harvesting.

In terms of use, a method for protecting plants, includes: (refer to FIGS. 1-16)
(a) providing plants 600;
(b) providing a cover 20 for the plants 600, including:
a frame 22 having a rectangular top tier of rods 24, a rectangular bottom tier of rods 25, four vertical supports 26 which connect the top tier of rods 24 to the bottom tier of rods 25, and four sides A, B, C, and D;
a side cover 28 which is shaped and dimensioned to cover the four sides A, B, C, and D, the side cover having four sides A', B', C', and D', a top 30, four top corners, and a bottom 32;
the side cover 28 including four corner closures 30A, 30B, 30C, and 30D disposed at the four top corners;
the side cover 28 including a side closure 34;
the side cover 28 including a skirt 37 disposed at the bottom 32;
a top cover 36 which is shaped and dimensioned to cover the top 30 of the side cover 28 and the top tier of rods 24;
a crown frame 38 which is shaped and dimensioned to fit around the top cover 36;
(c) opening the four corner closures 30A, 30B, 30C, and 30D of the side cover 28;
(d) opening the side closure 34 of the side cover 28;
(e) positioning the side 28 cover around the frame 22;
(f) closing the four corner closures 30A, 30B, 30C, and 30D of the side cover 28;
(g) closing the side closure 34 of the side cover 28;
(h) using the top cover 36 to cover the top 30 of the side cover 28 and the top tier of rods 24;
(i) fitting the crown frame 38 around the top cover 36; and,
(j) placing the cover 20 over the plants 600.
The method further including:
providing dirt 700; and,
after (j), placing the dirt 700 on top of the skirt 37.

The embodiments of the cover for plants and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the cover and method should be construed as limiting the invention to a particular embodiment or combination of embodiments. The scope of the invention is defined by the appended claims.

I claim:
1. A cover for plants, comprising:
a frame having a rectangular top tier of rods which has four corners, a rectangular bottom tier of rods, four vertical supports which connect said top tier of rods to said bottom tier of rods, and four sides;

a side cover which is shaped and dimensioned to cover said four sides of said frame, said side cover having four sides, a top, four top corners, and a bottom;

said side cover including four corner closures disposed at said four top corners;

said four corner closures positionable so that one said corner closure is disposed adjacent to each of said four corners of said rectangular top tier of rods;

said side cover including a side closure;

said side cover including a skirt disposed at said bottom;

a top cover which is shaped and dimensioned to cover said top of said side cover and said top tier of rods;

a crown frame which is shaped and dimensioned to fit around said top cover;

said top of said side cover positionable to have (1) a closed perimeter, and (2) an open perimeter, said open perimeter being greater than said closed perimeter;

each said corner closure including two strips of cooperating hook-and-loop material; and, said four corner closures positionable to (1) a closed position wherein said top of said side cover has said closed perimeter, and (2) an open position wherein said top of said side cover has said open perimeter and, in said closed position said four corner closures overlap said frame and hold said top of said side cover in place on said frame; in said open position said four corner closures facilitate putting said side cover around said frame; and, in both said closed position and said open position of said four corner closures, said side cover being a continuous unbroken sleeve.

2. The cover for plants according to claim 1, further including:

said top tier of rods having a first diameter; and, said bottom tier of rods having a second diameter, said first diameter being greater than said second diameter.

3. The cover for plants according to claim 1, further including:

said skirt including four corner inverted pleats.

4. The cover for plants according to claim 1, further including:

said side closure including a pleat and two strips of cooperating hook-and-loop material.

5. The cover for plants according to claim 1 further including:

said side cover including four side closures.

6. The cover for plants according to claim 1, further including; said top tier or rods having a first diameter; said bottom tier of rods having a second diameter, said first diameter being greater than said second diameter; said skirt including four corner inverted pleats; and, said side closure including a pleat and two strips of cooperating hook-and-loop material.

7. A method for protecting plants, comprising:
(a) providing plants;
(b) providing a cover for said plants, including:

a frame having a rectangular top tier of rods which has four corners, a rectangular bottom tier of rods, four vertical supports which connect said top tier of rods to said bottom tier of rods, and four sides;

a side cover which is shaped and dimensioned to cover said four sides, said side cover having four sides, a top, four top corners, and a bottom;

said side cover including four corner closures disposed at said four top corners;

said top of said side cover positionable to have (1) a closed perimeter, and (2) an open perimeter, said open perimeter being greater than said closed perimeter;

said four corner closures positionable to (1) a closed position wherein said top of said side cover has said closed perimeter, and (2) an open position wherein said top of said side cover has said open perimeter;

said four corner closures positionable so that one said corner closure is disposed adjacent to each of said four corners of said rectangular top tier of rods; and in said closed position said four corner closures overlap said frame and hold said top of said side cover in place on said frame; in said open position said four corner closures facilitate putting said side cover around said frame; and, in both said closed position and said open position of said four corner closures, said side cover being a continuous unbroken sleeve;

said side cover including a side closure, said side closure including a pleat and two strips of cooperating hook-and-loop material;

said side cover including a skirt disposed at said bottom;

a top cover which is shaped and dimensioned to cover said top of said side cover and said top tier of rods; and, a crown frame which is shaped and dimensioned to fit around said top cover;

(c) opening said four corner closures of said side cover;
(d) opening said side closure of said side cover;
(e) positioning said side cover around said frame;
(f) closing said four corner closures of said side cover;
(g) closing said side closure of said side cover;
(h) using said top cover to cover said top of said side cover and said top tier of rods;
(i) fitting said crown frame around said top cover; and,
(j) placing said cover over said plants.

8. The method of claim 7, further including:
providing dirt; and,
after (j), placing said dirt on top of said skirt.

9. The method of claim 7, further including: in (e), said positioning including (1) inverting said frame from its original position and placing said frame upon a support surface, (2) inverting said side cover from its original position placing said side cover around said frame, and (3) inverting the frame and said cover back to their original positions.

* * * * *